April 29, 1958     A. R. LAUGHLIN     2,832,400
TIRE BEAD BREAKER WITH CIRCUMFERENTIALLY
DISTRIBUTED THRUST MEMBERS
Filed March 14, 1955     3 Sheets-Sheet 1

INVENTOR.
ALLAN R. LAUGHLIN
BY
ATTORNEY

April 29, 1958     A. R. LAUGHLIN     2,832,400
TIRE BEAD BREAKER WITH CIRCUMFERENTIALLY
DISTRIBUTED THRUST MEMBERS
Filed March 14, 1955     3 Sheets-Sheet 2
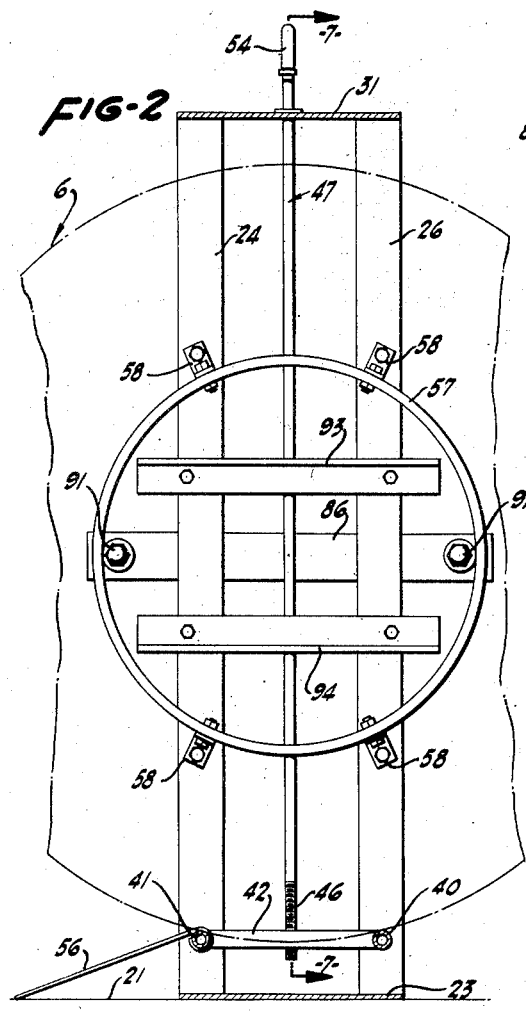
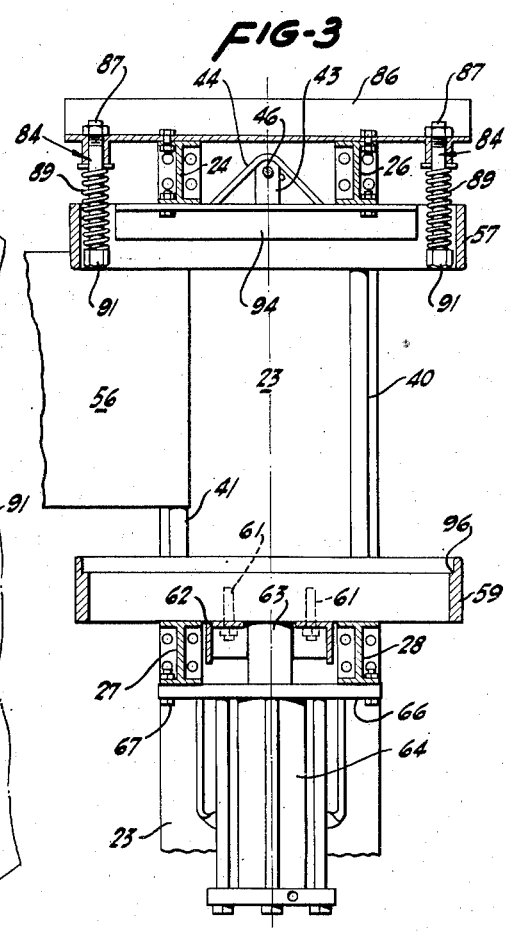
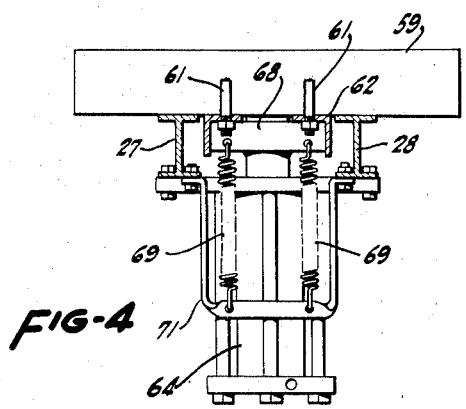
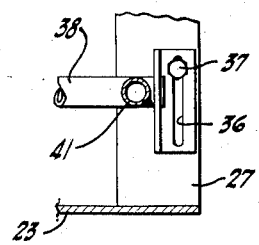
INVENTOR.
ALLAN R. LAUGHLIN
BY
ATTORNEY

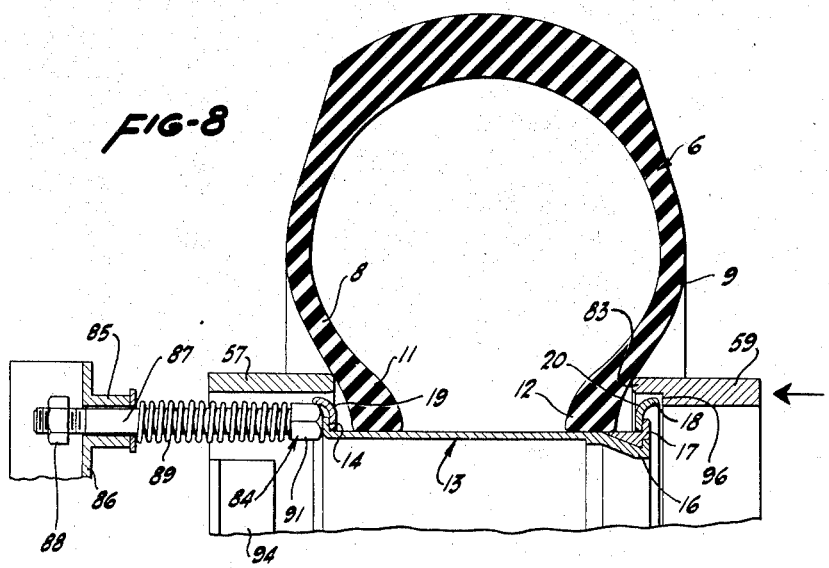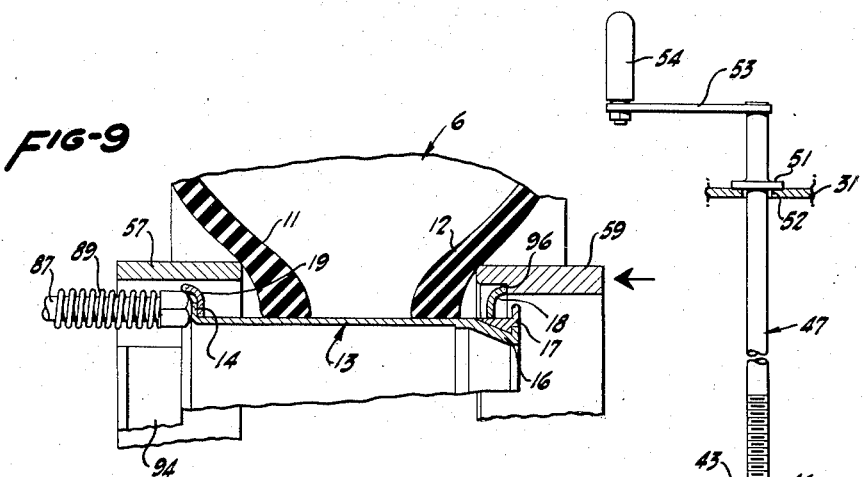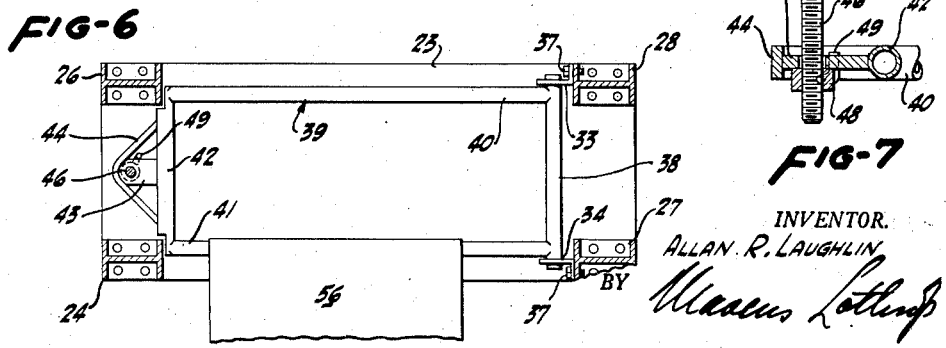

United States Patent Office 2,832,400
Patented Apr. 29, 1958

2,832,400

TIRE BEAD BREAKER WITH CIRCUMFERENTIALLY DISTRIBUTED THRUST MEMBERS

Allan R. Laughlin, Denver, Colo., assignor to Pacific Intermountain Express Company, a corporation Application March 14, 1955, Serial No. 494,110

4 Claims. (Cl. 157—1.28)

My invention relates to a device for assisting in the removal of tires or tire casings from their mounting wheels or wheel rims and is particularly concerned with a structure effective for use with a wheel or rim having a locking ring separable from the wheel or rim and for use with a tire that has substantially circular beads normally resting against the side portions of the rim.

Relatively heavy tire casings, such as those utilized on transcontinental trucks, have bead portions that are relatively stiff. Often a tire remains mounted on its rim for a long time without removal. The rim itself, whether or not a permanent part of a wheel, is a sturdy member typically having a central annular band terminating at one side in an outwardly extending flange and, at the other side, with an inwardly directed flange reversely bent to form a groove. A split locking ring has one portion seated in the groove and has another portion extending outwardly to match the other rim flange. In practice, it is very difficult after many miles or months of service in all weathers and under all conditions to remove the relatively stiff tire from the rim partly because it is hard to disengage the locking ring from the remainder of the rim.

It is therefore an object of my invention to provide a mechanism for assisting in the removal of the tire from the rim in a tire and rim assembly.

Another object of the invention is to provide a mechanism for assisting in disposing the tire beads in a suitable position so that the rim parts are readily disassembled for removal of the tire.

Another object of the invention is to provide a mechanism which has adequate force to break the tire beads away from the adjacent rim portions and to move the tire beads into parts of the rim for ready removal of the locking ring and the casing.

Another object of the invention is to provide a tire bead breaker which can also be utilized in the assembly of a tire on a rim when desired.

A still further object of the invention is to provide a tire bead breaker usable with tires which vary in actual dimensions even though they are of the same nominal size.

A still further object of the invention is to provide a tire bead breaker readily accommodated to work with tires of varying dimensions.

A still further object of the invention is to provide a tire bead breaker effectively operated with the power normally available.

Other objects, together with the foregoing, are attained in the embodiment of the invention described in the accompanying description and illustrated in the accompanying drawings, in which—

Figure 2 is a cross section of the tire bead breaker, the plane of section being indicated by the line 2—2 of Figure 1.

Figure 3 is an axial cross section on a horizontal plane indicated by the line 3—3 of Figure 1.

Figure 4 is a fragmentary cross section on a horizontal plane indicated by the line 4—4 of Figure 1.

Figure 5 is a detail cross section, the plane of which is indicated by the line 5—5 of Figure 1.

Figure 6 is a cross section in a horizontal plane indicated by the line 6—6 of Figure 1.

Figure 7 is a cross section of a detail, the plane of which is indicated by the line 7—7 of Figure 2.

Figure 8 is an enlarged cross section similar to the cross section of Figure 1, but showing the tire and rim assembly in partially disassembled position.

Figure 9 is a view similar to Figure 8 but showing the parts in a further stage of disassembly.

Figure 1:
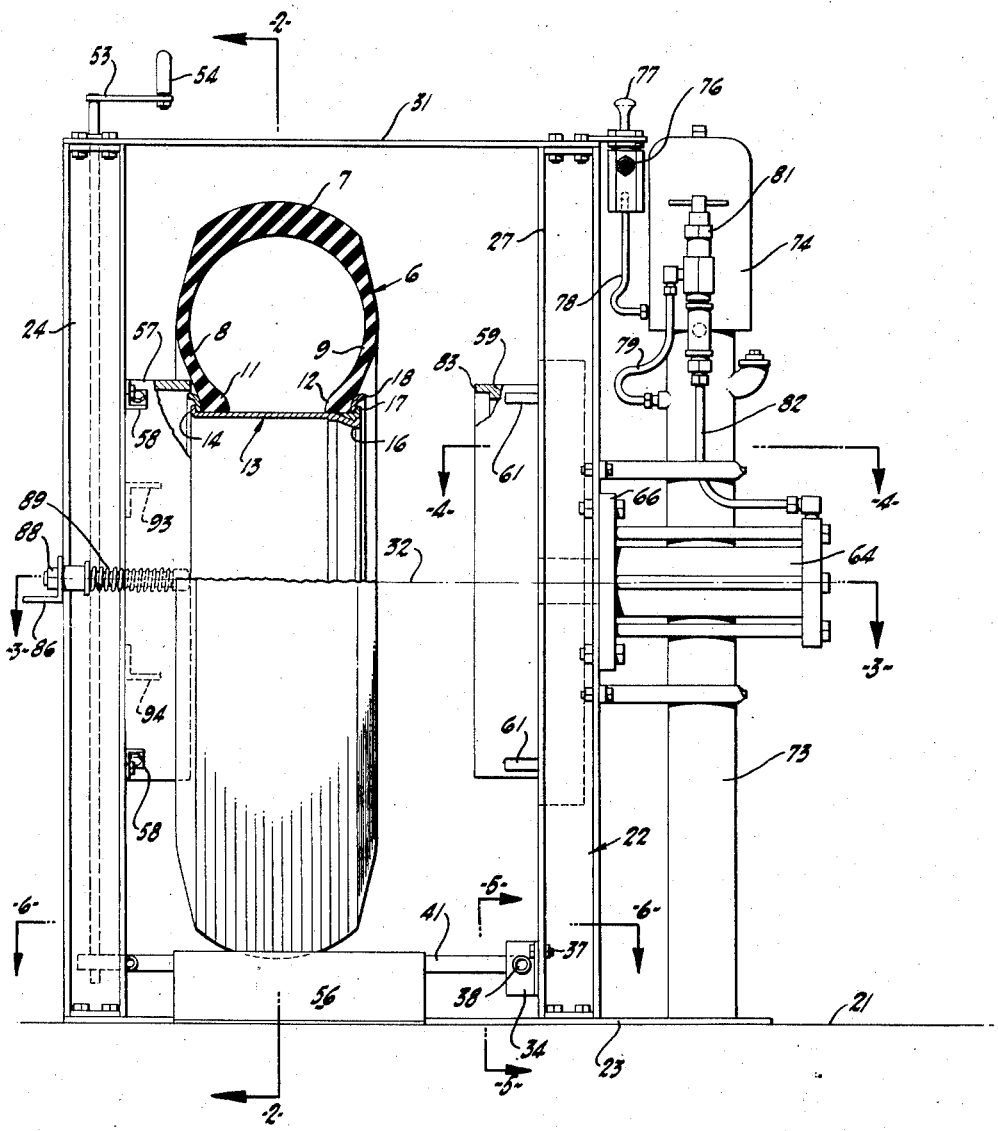
Figure 1 is a side elevation of a tire bead breaker constructed in accordance with my invention, a part of a tire and rim assembly thereon being disclosed in cross section on a vertical axial plane.

While the tire bead breaker of the invention can readily be embodied in a number of different forms, it has successfully been embodied as illustrated herein for use in connection with tire and rim assemblies utilized in transcontinental truck service. For the most part, the tires are all of the same nominal size, although the machine is not limited in its operation thereto, yet they vary in dimension from tire to tire particularly in outside diameter after an indeterminate amount of use. Each of the tires preferably includes a carcass 6 having a tread portion 7 and a pair of side walls 8 and 9 terminating in beads 11 and 12. These latter rest in tight engagement with the internal band 13 of a rim. Around one edge of the rim is an outwardly directed flange 14 engaging the outside of the bead 11. Around the other periphery, the rim 13 is given an inwardly extending reverse bend flange 16 to afford a groove in which a portion of a split locking ring 17 is disposed. The locking ring 17 secures an outwardly extending flange 18 corresponding substantially to the flange 14. Usually, the flanges 14 and 18 have curved end portions 19 and 20 to afford a smooth abutment for the outside of the outside walls 8 and 9 of the casing.

Pursuant to the invention, the tire bead breaker is mounted on the floor 21 at a convenient location and comprises a frame, generally designated 22, including a bottom plate 23, a left pair of uprights 24 and 26 and a right pair of uprights 27 and 28. The uprights are suitably connected to the base plate 23 and are likewise stiffened and secured together by a top plate 31 to afford a rigid supporting framework.

The left-hand uprights are separated far enough from the right-hand uprights to afford adequate space to receive a tire and rim assembly, as shown in Figure 1. Although successive tire and rim assemblies may vary substantially in diameter after different periods of use, means are provided for setting each assembly into the frame with its rotational axis 32 at a predetermined selected height or location.

For that reason, the right-hand uprights 27 and 28, adjacent their lower portion, are provided, as especially shown in Figures 5 and 6, with a pair of pierced angle brackets 33 and 34. Each of them is provided with an elongated slot 36 so that it can be variably positioned as to height and then clamped in location by a through bolt 37 in engagement with the respective one of the uprights 27 or 28. The brackets are normally set at approximately the right location for a particular size of tire and rim assembly and are then clamped.

Engaging the brackets is a cross pivot shaft 38 forming part of a support frame 39 having transverse members 40 and 41 joined by a cross bar 42 at the opposite side of the framework. The cross bar has an extension ledge 43 reinforced by a bent bar 44 and is pierced to pass freely the lower threaded end 46 of a crank shaft 47. A nut 48 engages the threaded end 46 and is kept from turning by a projecting rod 49 bent to engage the ledge 43.

At its upper end, the crank shaft 47 is enlarged by a flange 51 overlying an aperture 52 of substantial size in the top plate 31. The shaft 47 is thus freely rotatable with respect to the framework but is axially fixed against falling. At its upper end, the shaft 47 carries a crank 53 and an appropriate turning handle 54. The weight of the support frame 39 itself or when combined with a tire and rim load is sufficient to hold the flange 51 against the top plate and when the crank 54 is turned clockwise or counter-clockwise the frame 39 is raised or lowered.

One end of a ramp plate 56 is loosely curled around the rod 41 and the other end lies on the floor 21. A tire and rim assembly rolled up the ramp 56 drops slightly to lodge between the rods 40 and 41. Before or after that the handle 54 is appropriately operated and the frame 39 thus is lifted or lowered so that the rotational axis 32 of the assembly is at a selected location within the frame 22. When the assembly is in this general position it is accurately located with respect to a ring 57 concentric with the axis 32 and secured to the uprights 24 and 26 by bolted clips 58. The diameter of the ring 57 is slightly larger than the diameter of the outer portion 16 of the rim flange 14 and is therefore effective readily to overlie that flange and to be then disposed against or in abutment with the side wall 8 of the tire casing.

Also co-axially mounted on the frame and spaced apart a predetermined distance from the ring 57 is another ring 59 having a diameter for the most part the same as that of the ring 57 and disposed in opposition thereto. The ring 59 is not fixed on the frame as is the ring 57 but rather is movable along the axis 32 toward and away from the ring 57. For this purpose the ring 59, as shown especially in Figures 1 and 3, is provided with lugs 61 in engagement with a plunger 62 including appropriate diametral straps spanning the ring and secured to the end of a piston rod 63 extending from an expansible chamber mechanism 64.

This expansible chamber mechanism includes a hydraulic cylinder having an inward flange 66 appropriately provided with fastenings 67 to secure it removably to the uprights 27 and 28 of the frame. An internal piston (not shown) serves to eject the piston rod 63 under force and to move the ring 59 toward the ring 57. To afford a return motion, the plunger 62 includes in its makeup cross bars 68 to which a plurality of coil springs 69 are hooked. The outer ends of such springs are secured to frame straps 71 secured to the uprights 27 and 28.

In order to operate the expansible chamber mechanism 64 under hydraulic pressure, the base plate 23 serves as the mounting for a pedestal and hydraulic reservoir 73 serving as a source of hydraulic fluid for a hydraulic pump 74 of a conventional kind. This pump is preferably operated by compressed air, as that is normally available in a shop working on tires. The shop air is conveniently led into an inlet duct 76 under the control of a hand valve 77 and then flows through a pipe 78 to the interior mechanism of the oil pump 74.

Oil from the reservoir is taken into the pump and is expelled under pressure through a pipe 82 leading to the interior of the expansible chamber mechanism 64. When the valve 77 is appropriately opened, the air pressure operates the oil pump so that the expansible chamber mechanism 64 is expanded and the ring 59 is moved with considerable force toward the ring 57. When the valve 77 is closed, then the springs 69 are effective to retract the ring 59 and to spread it away from the ring 57 and to return the oil within the expansible chamber mechanism 64 through the pipe 82. A previously closed needle valve 81 is opened so that return flow passes through it and through a pipe 79 back to the reservoir 73.

In the operation of the device with the tire and rim assembly positioned substantially as shown in Figure 1, the valve 77 is operated so that the ring 59 advances until the forward portion 83 of the ring 59 comes into abutment with the side wall 9 of the tire, about as shown in Figure 8. The movement of the ring 59 against the tire casing tends to displace the casing toward the left of the figures. The side wall 8 is displaced or pressed axially against the fixed ring 57. The rim 13 is moved leftward until the portion 19 of the flange 14 is forcibly pulled away from the detained bead 11 and side wall 8.

At about this juncture, the rim 14 comes into firm abutment with one of a pair of resiliently mounted plungers 84. These are movable in an axial direction by virtue of their mounting in bosses 85 extended from a cross bar 86 fixed on the uprights 24 and 26. The plungers 84 have reduced bodies 87 passing through the bosses and carry stop nuts 88 at their remote ends. Coil springs 89 surround the plungers between the bosses 86 and enlarged heads 91 on the plungers. Thus, as the rim 13 is translated toward the left in the figures the plungers are also displaced to the left and the springs 89 are compressed.

Eventually in such leftward displacement, the rim flange 14 comes into firm abutment with a stop. The stop comprises, as especially shown in Figures 2 and 3, a plurality of angles 93 and 94 which span the uprights 24 and 26, and are appropriately spaced apart. The corners of the angle flanges are in appropriate locations to engage with the flange 14 between the plunger heads 91. When that occurs, the rim 13 can no longer travel toward the left under the impetus of the portion 83 of the ring 59 bearing against the side wall 9. Consequently, further movement of the ring 59 displaces the side wall 9 and the bead 12 relative to the rim 13 and away from the flange 18.

In the event the flange 18 does not move relative to the rim 13, means are provided for forcing it to do so. An annular shoulder 96 is formed in the ring 59 and has a diameter to engage the rim flange portion 20. The shoulder 96 is spaced apart from the angles 93 and 94 a greater distance than the rings 57 and 59 are apart. So the shoulder 96 then mechanically engages the flange 18 and forces it to the left far enough to override the locking ring 17 and about twice as far as the displacement illustrated in Figure 9, which is an intermediate position.

As soon as the ring 59 has travelled a maximum amount to the left, all parts of the rim and tire assembly are broken free of each other and the split ring 17 can readily be removed. This is done by a mechanic reaching in through the hollow ring 59 with an appropriate dislodging tool and, in effect, "peeling" the split ring 17 out of the groove 16. In some instances, once the parts are effectively loosened, they can be removed bodily from the machine and then subsequently disassembled. In any event, when the parts are all broken loose or partially removed further work can continue.

When the valve 77 is reversed, the springs 69 retract the ring 59. In addition, the previously compressed plungers 84 become effective since the stored energy in the compressed springs 89 drives the loose assembly, including the rim 13, to the right in the figures until such time as the ring 59 has substantially approached its Figure 1 retracted position and the loosely assembled casing and rim are back about in the position shown in Figure 1 or slightly to the right thereof. The mechanical parts of the machine are then in their initial positions and the loosely assembled or partially disassembled tire and rim structure is rolled out of its location between the rods 40 and 41 by a slight lifting movement over the rod 41 and then rolls down the ramp 56 for further work.

While this mechanism operating under power is primarily effective for dislodging casings from rims, particularly when high friction or rusting between them has made such an operation extremely difficult, it is also possible, by a reverse technique, to assist in assembling the casing on the rim by displacing the casing to the left of the position shown in Figure 9 to permit the ready introduction of the locking ring 17 into the groove 16. Following this the ring 59 is retracted and the casing is removed from the machine and inflated for use in the customary way.

In general, there is afforded herewith a tire bead breaker effective for heavy duty service to facilitate the removal of casings from rims and in some instances to facilitate the assembly thereof. The machine operates on shop air which is normally available. It can easily be controlled by an unskilled operator. It increases the safety and the efficiency of the tire removing operation. The mechanism is minutely adjustable for size so that tires, although nominally the same, which have worn to different diameters can readily and easily be accommodated. With a further adjustment, even tires of different nominal sizes can readily be accommodated. Furthermore, in the event the rim architecture and size changes, it is simple to remove the first ring 57 and the second ring 59 and to substitute other comparable rings especially shaped and sized for the particular job in hand.

What is claimed is:

1. A tire bead breaker comprising a frame having spaced uprights, means between said uprights on said frame for supporting a tire and rim assembly with the axis thereof in a substantially horizontal position at a selected height, a first ring fixed on said frame concentric with said axis and adapted to engage one side of said tire, a second ring movably mounted on said frame concentric with said axis, means disposed entirely out of the space between said uprights for moving said second ring along said axis toward said first ring to engage the other side of and to displace said tire along said axis, means associated with said moving means for engaging said other side of said rim after the engagement of said second ring with said tire, and means on said frame for engaging said one side of said rim after the engagement of said first ring with said tire.

2. A tire bead breaker comprising a frame having a central space therein, means for supporting a tire and rim assembly on said frame within said space with the axis of said assembly at a selected location, a pair of arcuate tire engaging means of a greater diameter than said rim, means for mounting one of said tire engaging means on said frame concentric with said axis, an expansible chamber mechanism mounted coaxially on said frame entirely outside of said central space, means for mounting the other of said tire engaging means on said expansible chamber mechanism concentric with said axis, a first rim engaging means, means for mounting said first rim engaging means on said frame, a second rim engaging means, means for mounting said second rim engaging means on said expansible chamber mechanism, and resilient rim engaging members mounted on said frame in a position to resist at least part of the movement of said rim toward said first rim engaging means.

3. A tire bead breaker comprising a frame, means for supporting a tire and rim assembly on said frame with the axis thereof at a selected location, a pair of rings, means for mounting said rings on said frame concentric with said axis and axially spaced apart a predetermined distance, an expansible chamber mechanism, means for mounting said expansible chamber mechanism coaxially on said frame for moving one of said rings axially towards the other, a plurality of stop members, means for mounting one of said stop members on said expansible chamber mechanism and the other of said stop members on said frame, said stop members being concentric with said axis and axially spaced apart a greater distance than said predetermined distance, and means on said frame for resiliently resisting the movement of said one stop member with said one ring toward the other stop member when said tire and rim assembly is therebetween.

4. A tire bead breaker comprising a frame having uprights disposed to leave an intervening space, means for supporting a tire and rim assembly on said frame within said space and with the axis thereof in a substantially horizontal position and at a selected location, a pair of rings of greater diameter than said rim, means for mounting said rings on said frame concentric with said axis and to lie on opposite sides of said tire and rim assembly within said space, an expansible chamber mechanism on said frame entirely on one side of said space for moving said rings relatively toward and away from each other, stop members arranged concentrically with said axis at substantially diametrically opposite points within each of said rings and a greater distance axially apart than the adjacent portions of said rings, and means for mounting said stop members on said frame and on said expansible chamber mechanism respectively for movement of said stop members with said rings.

References Cited in the file of this patent

UNITED STATES PATENTS

| | | |
|---|---|---|
| 2,423,652 | Kelley | July 8, 1947 |
| 2,439,135 | Johnson et al. | Apr. 6, 1948 |
| 2,469,723 | Greene | May 10, 1949 |
| 2,470,534 | Thomas | May 17, 1949 |
| 2,498,075 | Fishback | Feb. 21, 1950 |
| 2,518,126 | Daw et al. | Aug. 8, 1950 |
| 2,521,149 | Butler et al. | Sept. 5, 1950 |
| 2,562,995 | Watkins | Aug. 7, 1951 |
| 2,585,628 | Crane | Feb. 12, 1952 |
| 2,595,258 | Hildred | May 6, 1952 |